(12) United States Patent
Puckace et al.

(10) Patent No.: US 9,195,964 B2
(45) Date of Patent: Nov. 24, 2015

(54) METHOD OF DETERMINING OPTIMAL CHANGE INTERVAL FOR A FUNCTIONAL FLUID

(75) Inventors: James S. Puckace, North Madison, OH (US); John J. Redmon, Lakewood, OH (US); Holly Fitzgerald, Avon Lake, OH (US); Osama Khalid Ismail, Willoughby Hills, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 349 days.

(21) Appl. No.: 13/574,801

(22) PCT Filed: Jan. 25, 2011

(86) PCT No.: PCT/US2011/022305
§ 371 (c)(1),
(2), (4) Date: Nov. 7, 2012

(87) PCT Pub. No.: WO2011/094167
PCT Pub. Date: Aug. 4, 2011

(65) Prior Publication Data
US 2013/0046433 A1   Feb. 21, 2013

Related U.S. Application Data

(60) Provisional application No. 61/298,930, filed on Jan. 28, 2010.

(51) Int. Cl.
*G01M 17/00* (2006.01)
*G06Q 10/10* (2012.01)

(52) U.S. Cl.
CPC ..................................... *G06Q 10/10* (2013.01)

(58) Field of Classification Search
CPC ......... G06Q 10/10; G07C 5/008; G07C 5/085
See application file for complete search history.

(56) References Cited

U.S. PATENT DOCUMENTS

| | | | |
|---|---|---|---|
| 5,592,395 A * | 1/1997 | Braun et al. | 702/50 |
| 5,604,441 A | 2/1997 | Freese et al. | |
| 6,037,864 A | 3/2000 | Sem et al. | |
| 6,526,335 B1 | 2/2003 | Treyz et al. | |
| 2004/0093155 A1 | 5/2004 | Simonds et al. | |
| 2005/0062596 A1* | 3/2005 | Gornick | 340/457.4 |
| 2007/0043487 A1 | 2/2007 | Krzystofczyk et al. | |
| 2008/0269977 A1 | 10/2008 | Palladino | |

OTHER PUBLICATIONS

Corresponding PCT Publication No. 2011/094167 A2 published Aug. 4, 2011.
Corresponding PCT Publication No. 2011/094167 A3 Search Report published Aug. 4, 2011.
Written Opinion from corresponding International Application No. PCT/US2011/022305 dated Nov. 22, 2011.

* cited by examiner

*Primary Examiner* — Mary Cheung
(74) *Attorney, Agent, or Firm* — Iken S. Sans; Christopher D. Hilker; Teresan W. Gilbert

(57) ABSTRACT

The present invention relates to a tool for determining, improving and/or optimizing the change interval of a functional fluid utilized in a piece of equipment by using information on the piece of the equipment and its operating conditions. In particular, the present invention relates to the optimization of the oil drain interval of a vehicle by using a base change interval and optimizing it based on the operating conditions the vehicle experiences.

20 Claims, No Drawings

METHOD OF DETERMINING OPTIMAL CHANGE INTERVAL FOR A FUNCTIONAL FLUID

BACKGROUND OF THE INVENTION

Many pieces of equipment utilize one or more functional fluids in their operation, for example an engine utilizes engine oil. Draining and replacing these functional fluids is part of the normal maintenance of such equipment. Changing such functional fluids at appropriate intervals helps to ensure the proper operation of the equipment involved as well as avoiding damage and the need for costly repairs and equipment down-time.

Often, the manufacturer of a piece of equipment recommends a change interval for a functional fluid the piece of equipment uses. Such change intervals may be based on hours of operation, absolute time, mileage and/or distance traveled by the piece of equipment such as a vehicle, number of times the equipment has been used, or similar information. The operator of the piece of equipment then decides when to change the functional fluid involved, generally following the manufacture's suggestion. The manufacture's suggestion often does not taken into account and/or cannot be adjusted to account for the operating conditions the piece of equipment is actually experiencing. Thus using the manufacture's suggested change interval often results in fluids being changed too soon or too late than what would be possible and/or optimal.

Changing functional fluids is expensive, not only due to the cost of the fluid itself (and sometimes disposal costs of the spent fluid) but also due to the labor costs involved and the cost of the down time of the equipment. So there is a need to ensure a functional fluid is changed only when necessary, and not more frequently than needed, in order to save costs.

However, it is also expensive if functional fluids are not changed often enough. Failure to change functional fluids at the appropriate time can lead to increased equipment wear and even damage. Such wear and damage can often result in the need for equipment repairs, which also involve substantial costs in the form of parts, labor and down time. So there is a need to ensure a functional fluid is changed at the appropriate time, before the use of a spent functional fluid results in avoidable damage to a piece of equipment, in order to save costs.

Therefore there is a need for a tool that aides equipment operators in determining an improved and/or optimal change interval for a functional fluid the equipment utilizes.

SUMMARY OF THE INVENTION

The present invention relates to a tool for determining, improving and/or optimizing the change interval of a functional fluid utilized in a piece of equipment by using information on the piece of the equipment and its operating conditions. In particular, the present invention relates to the optimization of the oil drain interval of a vehicle by using a base change interval and optimizing it based on the operating conditions the vehicle experiences.

The present invention includes a computer implemented method of determining an optimal change interval for a functional fluid utilized in the operation of a piece of equipment, comprising a computer system for collecting information on said piece of equipment and said functional fluid wherein the computer system calculates the optimal change interval. The methods of the present invention include: (a) a computer system that obtains information on the piece of equipment; (b) said computer system retrieving a base change interval for the functional fluid in said piece of equipment from a reference database, utilizing the information obtained in (a); (c) said computer system obtaining at least one piece of information relating to the operating conditions of said piece of equipment that utilizes said functional fluid; (d) said computer system creating a data set from the information obtained in steps (a), (b) and (c) wherein each piece of information relating to the equipment's operating conditions is transformed into a numerical adjustment factor; and (e) said computer system calculating an optimal fluid change interval by adjusting said base change interval through the application of one or more of said numerical adjustment factors.

In some embodiments the piece of equipment involved in the methods of the present invention is a vehicle comprising an internal combustion engine; the functional fluid is an engine oil, a transmission fluid, a brake fluid, a coolant, or a gear lubricant; the base change interval is the change interval for the fluid recommended by the vehicle's manufacturer; and the information relating to the operating conditions of the piece of equipment relate to operating conditions of the vehicle.

The invention further provides a method of determining a customized change interval for a functional fluid, wherein said functional fluid is utilized in a piece of equipment and wherein said fluid is periodically changed, by using a wide area computer network, said method comprising the steps of: (a) obtaining and/or inputting data, said data comprising type, condition and/or operating information said piece of equipment in which the functional fluid is utilized, wherein said information is sufficient to determine and/or estimate the condition of the piece of equipment and/or the operating conditions said piece of equipment experiences; (b) analyzing the data by computer; and (c) providing the customized change interval for said functional fluid which takes into account said information obtained and/or inputted in step (a).

The invention further provides an internet-based functional fluid change interval calculating and reporting system comprising: (a) an application service provider; (b) a server operable by said application service provider, said server including an operating control system, an internet connection and functional fluid change interval calculation software executable on said control system to utilize a database of functional fluid related data and/or functional fluid-utilizing equipment related data; (c) a client connected over the internet to said application service provider, by an internet browser running on a remote computer non-local from said application service provider, to thereby facilitate communications related to the use of said functional fluid change interval calculation software over said internet between said server and said client; and (d) a hypertext markup language compliant page on said server and accessible through said internet connection, said hypertext markup language compliant page displaying output generated by said functional fluid change interval calculation software and having an embedded function displayed on said page and operable to facilitate said communications related to the use of said functional fluid change interval calculation software over said internet between said server and said client; wherein said embedded function is operable to run at said server, when said internet browser is running on said remote computer accesses said hypertext markup language compliant page, and said embedded function is selected, to thereby permit selected access by said client using said internet browser to said functional fluid change interval calculation software, in order to access said lubricant related data.

DETAILED DESCRIPTION OF THE INVENTION

Various preferred features and embodiments will be described below by way of non-limiting illustration.

The present invention provides a means of determining an improved and/or optimal change interval for a functional fluid utilized in the operation of a piece of equipment.

The equipment with which the present invention may be used is not overly limited so long as the equipment utilizes at least one functional fluid in its operation. Examples of such equipment include internal combustion engines, gas turbines, hydraulic equipment, and the like. In some embodiments the equipment is an internal combustion engine, and in other embodiments the equipment is a vehicle, including vehicles that contains an internal combustion. Examples of such vehicles include trucks and passenger vehicles, and in particle passenger cars.

The types of functional fluids with which the present invention may be used are not overly limited. Suitable functional fluids include: gear oils, transmission oils, hydraulic fluids, engine oils, two cycle oils, metalworking fluid, brake fluid, coolant, ands the like. In one embodiment the functional fluid is engine oil. In another embodiment the functional fluid is gear oil. In another embodiment the preferred functional fluid is a transmission fluid. In another embodiment the preferred functional fluid is a hydraulic fluid.

In some embodiments the present invention is a computer implemented method of determining an improved and/or optimal change interval for a functional fluid utilized in the operation of a piece of equipment. The methods may comprise a computer system for collecting information on the piece of equipment and the functional fluid. The computer system uses this information to calculate an improved and/or optimal change interval. The methods of the present invention include multiple steps, including one or more of those described below.

The computer system can obtain information on the piece of equipment, such as the equipment type, its make, model, manufacturer, year of manufacture and combinations thereof.

The computer system can then retrieve a base change interval for the functional fluid when used in the identified piece of equipment. This information may come from a reference database the computer system can access, utilizing the information obtained on the equipment. The database may be present locally, that is on the same computer system carrying out the methods of the present invention. The database my also be located externally on another computer system which the computer system carrying out the methods of the present invention can access over a public or private network, or even the internet.

In some cases there may be more than one base change interval, for example in the case of motor oil used in the engine of a vehicle, the manufacture may recommend one base change interval for conventional motor oil and a different base change interval for synthetic motor oil. In such cases, the system may ask the user which type of fluid he uses and/or would like the system to consider. In such cases the system may also use all base change intervals available and complete the calculation for each one, providing the user with all the results, for example a customized oil change interval for conventional oil and another customized oil change interval for synthetic oil.

The computer system may also obtain at least one piece of information relating to the operating conditions of the piece of equipment that uses the functional fluid in question.

The computer system can then create a data set from the information obtained in steps described above wherein each piece of information relating to the equipment's operating conditions is transformed into a numerical adjustment factor.

The computer system can then calculate an improved and/or optimal fluid change interval by adjusting said base change interval through the application of one or more of said numerical adjustment factors.

In other embodiments the methods of the present invention include one or more of the following steps described below. The methods involve determining a customized change interval for a functional fluid, such as engine oil. In such embodiments the methods may be carried out by using a wide area computer network.

The methods may include obtaining and/or inputting data, where the data includes the type, condition and/or operating information about the piece of equipment in which the functional fluid is utilized. This information should be sufficient to determine and/or estimate the condition of the piece of equipment and/or the operating conditions said piece of equipment experiences.

The methods may then include the analyzing of the data by computer. The analysis results in a customized change interval for the functional fluid where the change interval takes into account said information obtained and/or inputted into the system.

In still other embodiments the present invention includes an internet-based functional fluid change interval calculating and reporting system comprising. Such systems include an application service provider and a server operable by said application service provider. The server includes an operating control system, an internet connection and functional fluid change interval calculation software executable on said control system to utilize a database of functional fluid related data and/or functional fluid-utilizing equipment related data.

The system may also include a client connected over the internet to said application service provider, by an internet browser running on a remote computer non-local from said application service provider, to thereby facilitate communications related to the use of said functional fluid change interval calculation software over said internet between said server and said client.

The system may still further include a hypertext markup language compliant page on the server and accessible through the internet connection, where the hypertext markup language compliant page displaying output generated by the functional fluid change interval calculation software and having an embedded function displayed on the page and operable to facilitate the communications related to the use of the functional fluid change interval calculation software over the internet between the server and the client.

The embedded function is operable to run at and/or on the server, when the internet browser is running on the remote computer accesses the hypertext markup language compliant page, and the embedded function is selected, to thereby permit selected access by the client using the internet browser to the functional fluid change interval calculation software, in order to access the lubricant related data.

In still further embodiments the methods of the present invention further include a plurality of clients connected over the internet to the application service provider. These connections may be made by respective internet browsers running on respective remote computers non-local from the application service provider, which facilitate communications related to the use of the functional fluid change interval calculation software over the internet between the server and the clients. The data on this database may comprise records uniquely related to each of clients that use the system, such that the each client's records are separate and distinct form each others and secure. The systems of the present invention may allow for each of the clients to separately access its own data and records in the database and selectively preclude each of the other clients from accessing the records and data of any of the other clients using the system. The system may also allow clients to search for data within their own records in the database.

The methods and systems of the present invention may also allow for the direct entry of functional fluid information and/or functional fluid-utilizing equipment information by the clients using the system. This information may then be utilized by the functional fluid change interval calculation software to calculate the customized and/or optimized functional fluid change interval This customized and/or optimized functional fluid change interval may be calculated based on the database of functional fluid related data and/or functional fluid-utilizing equipment related data, the client provided functional fluid information and/or functional fluid-utilizing equipment information, or combinations thereof.

In each of the embodiments of the present invention, including the methods and/or systems described herein, the computer systems and/or methods involved each obtain at least some information. This information may be related to the piece of equipment involved, the functional fluid involved, the operating conditions the equipment and/or functional fluid experience, the operators of the equipment involved and combinations thereof. In any of these methods the means by which the computer system obtains such information is not overly limited. In some embodiments the information is obtained via the manual input of said information by a user of the computer system and/or an interface or communication device that is connected to the computer system. In some embodiments the computer system obtains information by retrieving said information from a computer monitoring system that collects operating condition data on said equipment through use of one or more sensors connected to the specific piece of equipment involved. In some embodiments the computer system obtain the information by retrieving typical operating conditions information from a reference database that correlates the piece of equipment to other information already in the computer system, for example data already entered via manual input by a user. In addition, combinations of one or more of these methods may also be used by the computer system to obtain the information it uses to carryout the methods of the present invention.

The information related to the operating conditions of the equipment and/or functional fluid are not overly limited. In some embodiments this information includes the location of the equipment, the age of the equipment, the primary use of the equipment, the amount of operation the equipment has experienced (i.e., mileage, hours, cycles, etc), the maintenance history of the equipment, information on the type, brand, and/or age of the functional fluid being used, information on the operating condition the equipment experiences, information on the primary operators of the equipment, information on the type, brand, components of and/or age of the equipment and/or a component thereof, information on the preferred maintenance level/regime of the equipment by owner, or combinations thereof.

In some embodiments the piece of equipment involved with the methods of the present invention is a vehicle, and in some embodiments a vehicle containing an internal combustion engine. In some of these embodiments the functional fluid involved is the engine oil used in the internal combustion engine. In any of these embodiments the information relating to the operating conditions of the vehicle may include: the location of the vehicle, the age of the vehicle, the primary use of the vehicle, the mileage on the vehicle, the maintenance history of the vehicle, information on the type, brand, and/or age of the functional fluid being used, the driving conditions the vehicle experiences, information on the primary operators of the vehicle, information on the type, brand, components of and/or age of the vehicle and/or a component thereof, information on the preferred maintenance level/regime of equipment by owner, or combinations thereof.

Information related to the driving conditions a vehicle experiences is not overly limited. In some embodiments such information includes: the actual, average and/or estimated miles the vehicle is driven over a given period of time, the type of duty cycles under which the mileage is incurred, for example city versus highway mileage and similar distinctions, whether and to what the extent that the vehicle experiences any extreme operating conditions, the amount of passenger and/or cargo weight and related duress the vehicle typically carries and the frequency of such instances, or combinations thereof.

Information related to the primary operators of the equipment and/or vehicle, is not overly limited. In some embodiments such information includes: the number of primary operators, the ages of the primary operators, the gender of the primary operators, each primary operator's actual, typical and/or estimated amount of use of the vehicle over a given period of time, operator experience level, the operating style and/or training of the operators, or combinations thereof.

Information related to extreme operating conditions the equipment and/or vehicle may experience is not overly limited. In some embodiments such information includes: the actual, average and/or estimated temperature and/or weather conditions the equipment experiences, each primary operator's actual, typical and/or estimated amount of use of the equipment over a given period of time, the type of terrain the equipment is operated on, whether the equipment tows a trailer or other piece of equipment, operates under large loads, and the frequency of such conditions, and if so, optionally one or more of the following: the actual, typical and/or estimated number of occurrences when the equipment is used to tow and/or is under significant loads; the actual, typical and/or estimated operating conditions during such occurrences; information on the trailer or other piece of equipment being towed, or loads involved; and combinations thereof.

Information regarding the users desired level of protection may also be used to calculate and/or determine the customized, improved and/or optimal fluid change interval. For example a user may be asked if he desires standard protection or higher than standard protection from his functional fluid and this response may be used when determining the customized change interval.

The methods and/or systems of the present invention may use one or more numerical adjustment factors (which may be referred to as factors or values herein) to calculate and/or determine the customized, improved and/or optimal fluid change interval. These factors may be values that are assigned to the various pieces of information collected and/or inputted into the systems described above. These factors are then used to modify the base fluid change interval in order to arrive at the customized, improved and/or optimal fluid change interval. In some embodiments some of the user inputted information is used to obtain additional information, such as the base change interval, and neither additional information nor the user inputted information used to retrieve it is assigned a factor. Some of the user inputted information is used to obtain additional information where the additional information is assigned a factor and where the user inputted information used to retrieve it may or may not be assigned a factor. Some of the user inputted information is not used to retrieve any additional information but rather is used to determine the next question to ask the user. Such information may or may not be assigned a factor.

In some embodiments each piece of information is assigned a numerical value. For example, where the piece of equipment is a vehicle and the fluid is engine oil, the numerical values may be assigned values ranging from −3000, −1500, −1000, −500, −400, or −300 up to 3000, 1500, 1000, 500, 400 or 300. Negative values would be assigned to pieces of information that would have a negative impact on a functional fluid, its service life or would otherwise provide a reason for shortening a fluid change interval. Positive values would be assigned to pieces of information that would have a positive impact on a functional fluid, its service life or would otherwise provide a reason for lengthening a fluid change interval. Values of a relatively smaller absolute magnitude would be assigned to pieces of information that would have limited impact on a functional fluid, its service life and/or its performance. Values of a relatively larger absolute magnitude would be assigned to pieces of information that would have significant impact on a functional fluid, its service life and/or its performance.

In embodiments where a user is asked to answer a specific question or provide a piece of information, or the system obtains such information from a database or similar source, each of the range of possible answers for the question involved would have a numerical value, such that the values for all of the responses involved span the range of possible values, or some subset thereof. For example, a response that indicates a vehicle regularly experiences extreme temperatures during its operation could be assigned a relatively large negative value, a response that indicates a vehicle only occasionally experiences extreme temperatures during its operation could be assigned a relatively small negative value, a response that indicates a vehicle is never used to tow another vehicle or carry heavy loads could be assigned a relatively large positive value, a response that indicates a vehicle is only rarely used to tow another vehicle or carry heavy loads could be assigned a relatively small positive value.

One or more of these values may be present in a database, contained within the computer system carrying out the methods of the present invention, or located externally but to which the computer system has access, as described above. The values may already be assigned to every possible response to a predetermined list of questions that a user would be asked to answer, or a series of specific responses may be offered to the user for a specific question, where each of the possible responses already has a value assigned based on its expected impact on fluid drain interval.

When all the information has been collected the system can calculate the new fluid drain interval by starting with the base drain interval and adding one or more of the values derived from the responses to the base interval. Any subset of the values may be used, ranging from one to all of them. Negative values would result in a reduction of the drain interval. Positive values would result in a lengthening of the drain interval. The result would be an improved fluid drain interval that takes the operating conditions and information specific to the piece of equipment involved into account. The use of a computer system to carry out the methods of the present invention allow the methods to be carried our more quickly and efficiently. In these embodiments the values that may be assigned to each piece of information must generally be selected with the base change interval in mind, that is the units in which the interval is measured (miles, hours, etc) and the value of the base change interval, thus ensuring the impact on the base change interval is appropriate for each piece of information considered.

In some embodiments the methods of the present invention are carried out as described above except that instead of specific values, each response is assigned a percentage value, some positive and some negative, with the sign of the percentage value determined based on the impact the specific piece of information is expected to have ton the fluid and/or piece of equipment and wherein the absolute magnitude (size) of the percentage value is determined based on the significance of the impact of the piece of information, as described above.

In such embodiments one or more of the resulting percentages are multiplied by the base fluid change interval, no matter what it's units, and the resulting series of values, or some subset thereof, may be added to the base change fluid interval, resulting in the improved fluid drain interval that takes the operating conditions and information specific to the piece of equipment involved into account. In other embodiments, the percentage values may of course be added together themselves and the resulting percentage value may then be multiplied by the base fluid change interval, thus resulting in the improve fluid change interval. The percentage values may range from −80%, −75%, −50%, −30%, −25%, −10%, −5%, −2% to 100%, 80%, 75%, 50%, 30%, 25%, 10%, 5% or 2%.

In these embodiments the percentage values that may be assigned to each piece of information may be selected regardless of the units of or starting value of the base change interval. Instead the appropriate percent change each piece of information warrants is considered, thus making these embodiments more universally applicable.

In still other embodiments, and similar to those described above, each piece of information collected by the system may be assigned a factor. The factors may be assigned to each possible response and/or piece of information collected. The factors may be assigned such that the more severe the piece of information the lower the value of the factor assigned to it and the less severs the piece of information the higher the value of the factor assigned. In some embodiments the factors may range in value from 0.1, 0.2, 0.4 or 0.5 to 2.0, 1.8, 1.5, 1.25, 1.0 or even 0.9. In some embodiments the factors range from 0.75, 0.85, 0.95 or 0.97 to 1.1 or 1.0. In such embodiments factors are assigned to the collected information and then the base change interval of the functional fluid is then multiplied by each of the assigned factors, thus resulting in the customized change interval for the functional fluid.

Also included in the present invention are embodiments where a user response, and/or the range of possible user responses, are each assigned a factor or value, which is then used to derive a factor that is then used in the calculation of the customized drain interval. For example, user responses may be assigned the values of 1, 2 and 3, in the order they are presented. A function may then be used to convert the value of the selected response into a factor, such as any of the factors described above, which may then be used by the system to calculate the customized fluid change interval. The original values which may be assigned and the functions used to convert them to factors for use in the described calculations are not overly limited. In some embodiments the functions are used solely from a point of programming convenience, so responses may be assigned whole cardinal numbers in the code, which are then converted by the function into factors useful in the methods of the present invention. In other embodiments, the functions may take other information into account, such as the user's preference for level of protection, and adjust the resulting factors used in the calculations accordingly.

In some embodiments the information to which one or more of the various values described above are assigned is collected by means of a questionnaire. The questionnaire may be displayed on a web site and allow a user to enter answers to one or more questions, thus supplying the information for use in the methods of the present invention. In some embodiments the questionnaire is displayed on a computer screen that is connected to a wide area computer network, which prompts a user to input information into said questionnaire. In still other embodiments one or more of the other steps is also carried out by a display on a computer screen, for example the resulting customized and/or optimized change interval for the functional fluid of interest, once calculated, may be displayed on the computer screen.

A user may be promoted to answer only a single question. In other embodiments a use may be prompted to answer multiple questions. In some embodiments the system may discard questions that the user fails to answer and not assign a factor and/or value. In other embodiments the system may assign a default factor and/or value for questions that the user does not answer.

In some embodiments: the piece of equipment involved is a vehicle comprising an internal combustion engine; the functional fluid is an engine oil, a transmission fluid, a brake fluid, a coolant, or a gear lubricant; the base change interval is the change interval for the fluid recommended by the vehicle's manufacturer; and the information relating to the operating conditions of the piece of equipment relate to operating conditions of the vehicle. In some embodiments this information is in the form of one or more answers provided to the system by a user made in response to one or more questions presented to the user by the system, and may also include information the system obtains from one or more databases using the information provided by the user (for example the system may use the vehicle information provided by the user to look up the manufacturer recommended fluid change interval in a database).

EXAMPLES

The invention will be further illustrated by the following examples, which sets forth particularly advantageous embodiments. While the examples are provided to illustrate the present invention, they are not intended to limit it Example 1

Oil Change Interval Calculator for a Gasoline Electric Generator

A system is designed to determine a customized oil change interval for a gasoline fueled electric portable generator. The systems asks a user the following set of questions using an internet browser displayed on a screen of a computer where each question has a set list of responses for the user to choose from.

TABLE 1

Set of Questions and Responses

| Question | Set of Responses |
|---|---|
| 1.1 Generator make/manufacturer. | A list of generator manufacturers. |
| 1.2 Generator model number | A list of models produced by the selected manufacturer. |

TABLE 1-continued

Set of Questions and Responses

| Question | Set of Responses |
|---|---|
| 1.3 Total hours of operation. | A list of ranges of hours corresponding to a low hours range, a medium hours range and a high hours range. |
| 1.4 Level of protection desired. | Minimal, normal or high. |
| 1.5 Frequency of operation in dusty conditions. | Never, infrequently, frequently or almost always. |
| 1.6 Frequency of operation extreme temperatures. | Never, infrequently, frequently or almost always. |
| 1.7 Frequency of prolonged periods (>8 hours) of operation. | Never, infrequently, frequently or almost always. |

The system uses the answers from questions 1.1 to 1.2 to look up the manufacture's recommended oil drain interval for the indentified generator, including the separate recommendations for conventional and synthetic motor oil where available. For questions 1.3 to 1.7 the system has pre-assigned factors for each possible answer. For example, in question 1.5 the response "never" is assigned a factor of 1.1, the response "infrequently" is assigned a factor of 1.0, the response "frequently" is assigned a factor of 0.99 and the response "almost always" is assigned a factor of 0.90. The system then uses each of the factors for the responses to questions 1.3 to 1.7 and the manufacture's recommended oil drain interval, to calculate the customized oil drain interval. Where conventional and synthetic motor oil recommendations are desired, the calculations are carried out twice, once to derive a conventional oil drain interval and once to derive a synthetic oil drain interval. The system then displays the customized oil drain interval(s) on the computer screen.

Example 2

Oil Change Interval Calculator for a Vehicle

A system is designed to determine a customized oil change interval for the oil used in the engine of a vehicle. The systems asks a user the following set of questions using an internet browser displayed on a screen of a computer where each question has a set list of responses for the user to choose from.

TABLE 2

Set of Questions and Responses

| Question | Set of Responses |
|---|---|
| 2.1 Year of vehicle manufacture. | A list of each year from 1980 to the present year. |
| 2.2 Vehicle make/manufacturer. | A list of vehicle manufacturers. |
| 2.3 Vehicle model. | A list of models produced by the selected manufacturer in the selected year. |
| 2.4 Vehicle mileage. | A list of ranges of mileage corresponding to a low mileage range, a medium mileage range and a high mileage range. |
| 2.5 Level of protection desired. | Minimal, normal or high. |
| 2.6 Frequency you drive in dusty conditions. | Never, infrequently, frequently or almost always. |
| 2.7 Frequency you drive in extreme temperatures. | Never, infrequently, frequently or almost always. |
| 2.8 Frequency you drive in for long periods in stop and go traffic. | Never, infrequently, frequently or almost always. |
| 2.9 Frequency you drive while towing and/or carrying heavy loads and/or in hilly terrain. | Never, infrequently, frequently or almost always. |

TABLE 2-continued

Set of Questions and Responses

| Question | Set of Responses |
| --- | --- |
| 2.10 Frequency you use alternative fuels such as E-85. | Never, infrequently, frequently or almost always. |

The system uses the answers from questions 2.1 to 2.3 to look up the manufacture's recommended oil drain interval for the indentified vehicle, including the separate recommendations for conventional and synthetic motor oil where available. For questions 2.4 to 2.10 the system has pre-assigned factors for each possible answer. For example, in question 2.6 the response "never" is assigned a factor of 1.1, the response "infrequently" is assigned a factor of 1.0, the response "frequently" is assigned a factor of 0.99 and the response "almost always" is assigned a factor of 0.90. The system then multiples each of the factors for the respouses to questions 2.4 to 2.10 by the manufacture's recommended oil drain interval, resulting in the customized oil drain interval. Where conventional and synthetic motor oil recommendations are available, the calculation is carried out twice. The system then displays the customized oil drain interval(s) on the computer screen.

Example 3

Hydraulic Fluid Change Interval Calculator for a Hydraulic Press

A system is designed to determine a customized oil change interval for the hydraulic fluid used in a hydraulic press. The systems asks a user the following set of questions using an internet browser displayed on a screen of a computer where each question has a set list of responses for the user to choose from.

TABLE 3

Set of Questions and Responses

| Question | Set of Responses |
| --- | --- |
| 3.1 Press make/manufacturer. | A list of press manufacturers. |
| 3.2 Press model number. | A list of models produced by the selected manufacturer. |
| 3.3 Total number of cycles. | A list of ranges of cycles corresponding to a low cycle range, a medium cycle range and a high cycle range. |
| 3.4 Level of protection desired. | Minimal, normal or high. |
| 3.5 Frequency of operation in dusty conditions. | Never, infrequently, frequently or almost always. |
| 3.6 Frequency of operation in extreme temperatures. | Never, infrequently, frequently or almost always. |

The system uses the answers from questions 3.1 to 3.2 to look up the manufacture's recommended oil drain interval for the indentified press. For questions 3.3 to 3.6 the system has pre-assigned factors for each possible answer. For example, in question 3.5 the response "never" is assigned a factor of 1.1, the response "infrequently" is assigned a factor of 1.0, the response "frequently" is assigned a factor of 0.99 and the response "almost always" is assigned a factor of 0.90. The system then multiples each of the factors for the responses to questions 3.3 to 3.6 by the manufacture's recommended change interval, resulting in the customized change interval. The system then displays the customized change interval on the computer screen.

What we claim:

1. A computer implemented method of determining an improved change interval for a functional fluid utilized in the operation of a vehicle, comprising a computer system for collecting information on said vehicle and said functional fluid wherein the computer system calculates the improved change interval, wherein the method comprises:
    (a) said computer system obtaining information on said vehicle;
    (b) said computer system retrieving a base change interval for the functional fluid in said vehicle from a reference database, utilizing the information obtained in (a);
    (c) said computer system obtaining information relating to the operating conditions of said vehicle that utilizes said functional fluid, wherein said information comprises;
        (i) the location of the vehicle;
        (ii) the age of the vehicle;
        (iii) the mileage on the vehicle;
        (iv) information on the type, brand, and/or age of the functional fluid being used;
        (v) the driving conditions the vehicle experiences; and
        (vi) information on the type, brand, components of and/or age of the vehicle and/or a component thereof;
    (d) said computer system creating a data set from the information obtained in steps (a), (b) and (c) wherein each piece of information relating to the vehicle's operating conditions is transformed into a numerical adjustment factor; and
    (e) said computer system calculating an optimal fluid change interval by adjusting said base change interval through the application of one or more of said numerical adjustment factors.

2. The method of claim 1 wherein said computer system obtains said information relating to the operating conditions of said vehicle from one or more of the following sources:
    (i) by a manual input of said information by a user;
    (ii) by retrieving said information from a computer monitoring system that collects operating condition data on said vehicle through use of one or more sensors connected to said equipment;
    (iii) by retrieving typical operating conditions information from a reference database that correlates said vehicle and information obtained from (a), (b) and/or (c) to typical operating conditions;
    (iv) combinations thereof.

3. The method of claim 1 wherein: said vehicle comprises an internal combustion engine; the functional fluid is an engine oil, a transmission fluid, a brake fluid, a coolant, or a gear lubricant; the base change interval is the change interval for the fluid recommended by the vehicle's manufacturer; and the information relating to the operating conditions of the piece of equipment relate to operating conditions of the vehicle.

4. The method of claim 1 wherein the information relating to the operating conditions of said vehicle further comprises at least one of the following:
    (i) the primary use of the vehicle;
    (ii) the maintenance history of the vehicle;
    (iii) information on the primary operators of the vehicle; or
    (iv) information on the preferred maintenance level/regime of equipment by owner.

5. The method of claim 4 wherein the information on the primary operators of the vehicle comprises at least one of the following:
    (i) the number of primary operators;
    (ii) the ages of the primary operators;
    (iii) the gender of the primary operators;

(iv) each primary operator's actual, typical and/or estimated amount of use of the vehicle over a given period of time;
(v) operator experience level; or
(vi) the operating style and/or training of the operators.

6. The method of claim 1 wherein the information on driving conditions the vehicle experiences comprises at least one of the following:
(i) the actual, average and/or estimated miles the vehicle is driven over a given period of time;
(ii) the type of duty cycles under which the mileage is incurred;
(iii) whether and to what the extent that the vehicle experiences any extreme operating conditions; or
(iv) the amount of passenger and/or cargo weight and related duress the vehicle typically carries.

7. The method of claim 6 wherein the information on extreme operating conditions comprises at least one of the following:
(i) the actual, average and/or estimated temperature and/or weather conditions the vehicle experiences;
(ii) each primary operator's actual, typical and/or estimated amount of use of the vehicle over a given period of time;
(iii) the type of terrain the vehicle is operated on; or
(iv) whether the vehicle tows a trailer or other vehicle and the frequency thereof; and if so, optionally one or more of the following: the actual, typical and/or estimated number of occurrences when the vehicle is used to tow; the actual, typical and/or estimated driving conditions during such occurrences; information on the trailer or other vehicle being towed; and combinations thereof.

8. The method of claim 1 wherein said numerical adjustment factors each independently correspond to a specific piece of operating condition information;
wherein each piece of operating condition is assigned a factor ranging from 0.1 to 2.0, with lower factors corresponding to more severe operating conditions and higher factors corresponding to less severe operating conditions, wherein the severity of the operating condition is based on the expected impact on the performance and service life of the functional fluid;
and wherein the base change interval is adjusted by multiplying each of the numerical adjustment factors with the base change interval, resulting in an improved fluid change interval.

9. The method of claim 1 wherein said numerical adjustment factors each independently correspond to a specific piece of operating condition information;
wherein each piece of operating condition is assigned a factor, wherein each factor is within the range of 0 to 100% of the value of the base change interval and may be positive or negative, with negative factors corresponding to more severe operating conditions and positive factors corresponding to less severe operating conditions, wherein the severity of the operating condition is based on the expected impact on the performance and service life of the functional fluid;
and wherein the base change interval is adjusted by adding each of the numerical adjustment factors to the base change interval, resulting in an improved fluid change interval.

10. The method of claim 1 wherein the method is carried out over the internet.

11. A method of determining an improved change interval for a functional fluid, wherein said functional fluid is utilized in a vehicle and wherein said fluid is periodically changed, by using a wide area computer network, said method comprising the steps of:
(a) obtaining and/or inputting data, said data comprising information relating to the operating conditions of said vehicle in which the functional fluid is utilized, wherein said information is sufficient to determine and/or estimate the condition of the vehicle and/or the operating conditions said vehicle experiences, wherein said information comprises;
(i) the location of the vehicle;
(ii) the age of the vehicle;
(iii) the mileage on the vehicle;
(iv) information on the type, brand, and/or age of the functional fluid being used;
(v) the driving conditions the vehicle experiences; and
(vi) information on the type, brand, components of and/or age of the vehicle and/or a component thereof;
(b) analyzing the data by computer; and
(c) providing the improved change interval for said functional fluid which takes into account said information obtained and/or inputted in step (a).

12. The method of claim 11 wherein the functional fluid is an engine oil, the functional fluid is utilized in an internal combustion engine, of said vehicle, and said improved change interval is the mileage at which said engine oil is to be drained from said engine and replaced with fresh engine oil.

13. The method of claim 11 wherein step (a) is carried out by displaying a questionnaire on a computer screen connected to a wide area computer network, and prompting a user to input information into said questionnaire.

14. The method of claim 13 wherein step (c) is carried out by displaying the improved change interval for said functional fluid on said computer screen.

15. The method of claim 13 wherein the information inputted into said questionnaire further comprises at least one of the following:
(i) the primary use of the vehicle;
(ii) the maintenance history of the vehicle;
(iii) information on the primary operators of the vehicle; or
(iv) information on the preferred maintenance level/regime of equipment by owner.

16. An internet-based functional fluid change interval calculating and reporting system comprising:
(a) an application service provider;
(b) a server operable by said application service provider, said server including an operating control system, an internet connection and functional fluid change interval calculation software executable on said control system to utilize a database of functional fluid related data and/or functional fluid-utilizing equipment related data;
(c) a client connected over the internet to said application service provider, by an internet browser running on a remote computer non-local from said application service provider, to thereby facilitate communications related to the use of said functional fluid change interval calculation software over said internet between said server and said client; and
(d) a hypertext markup language compliant page on said server and accessible through said internet connection, said hypertext markup language compliant page displaying output generated by said functional fluid change interval calculation software and having an embedded function displayed on said page and operable to facilitate said communications related to the use of said functional fluid change interval calculation software over said internet between said server and said client;

wherein said embedded function is operable to run at said server, when said internet browser is running on said remote computer accesses said hypertext markup language compliant page, and said embedded function is selected, to thereby permit selected access by said client using said internet browser to said functional fluid change interval calculation software, in order to access said lubricant related data;

wherein functional fluid-utilizing equipment is vehicle and wherein the functional fluid information and/or functional fluid utilizing equipment information entered by the client comprises the following:
(i) the location of the vehicle;
(ii) the age of the vehicle;
(iii) the mileage on the vehicle;
(vi) information on the type, brand, and/or age of the functional fluid being used;
(v) the driving conditions the vehicle experiences; and
(vi) information on the type, brand, components of and/or age of the vehicle and/or a component thereof.

17. The method of claim 16 wherein said internet-based functional fluid change interval calculating and reporting system further comprises a plurality of clients connected over the internet to said application service provider, by a respective internet browser running on a respective remote computer non-local from said application service provider, to thereby facilitate communications related to the use of said functional fluid change interval calculation software over said internet between said server and said clients;

wherein said data on said database comprises records uniquely related to each of said plurality of clients, the records for each client being separate and distinct from the records for each other client;

wherein said functional fluid change interval calculation software permits each of said plurality of clients to access its own uniuely related records in said database, and selectively precludes each of said plurality of clients from accessing the records in said database of each other client; and wherein said lubricant evaluation software permits said clients to search for data within their own uniquely related records.

18. The method of claim 16 wherein said functional fluid change interval calculation software permits entry by said clients of functional fluid information and/or functional fluid-utilizing equipment information, said information to be utilized by the functional fluid change interval calculation software;

wherein the method results in the functional fluid change interval calculation software providing an improved change interval based on: the database of functional fluid related data and/or functional fluid-utilizing equipment related data, the client provided functional fluid information and/or functional fluid-utilizing equipment information, or combinations thereof.

19. The method of claim 16 wherein the functional fluid is an engine oil, the functional fluid change interval calculation software is an engine oil change interval calculation software, the functional fluid-utilizing equipment is an internal combustion engine of said vehicle, and said improved change interval is the mileage at which said engine oil is to be drained from said engine and replaced with fresh engine oil.

20. The method of claim 16 wherein the functional fluid information and/or functional fluid-utilizing equipment information entered by the client further comprises at least one of the following:
(i)
(ii) the primary use of the vehicle;
(ii) the maintenance history of the vehicle;
(iii) information on the primary operators of the vehicle; or
(iv) information on the preferred maintenance level/regime of equipment by owner.

* * * * *